US011271662B2

(12) United States Patent
Dubash et al.

(10) Patent No.: US 11,271,662 B2
(45) Date of Patent: Mar. 8, 2022

(54) LOW POWER COMMUNICATION LINKS BETWEEN WIRELESS DEVICES

(71) Applicant: QUALCOMM Incorporated, San Diego, CA (US)

(72) Inventors: Noshir Dubash, Phoenix, AZ (US); Jeffrey Koeller, Mesa, AZ (US); Luis Briones, Chandler, AZ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/437,641

(22) Filed: Jun. 11, 2019

(65) Prior Publication Data
US 2020/0396011 A1 Dec. 17, 2020

(51) Int. Cl.
| | |
|---|---|
| H04B 7/00 | (2006.01) |
| H04B 13/00 | (2006.01) |
| H04W 76/19 | (2018.01) |
| H04W 4/80 | (2018.01) |
| H04B 5/00 | (2006.01) |

(52) U.S. Cl.
CPC ......... *H04B 13/005* (2013.01); *H04B 5/0031* (2013.01); *H04W 4/80* (2018.02); *H04W 76/19* (2018.02)

(58) Field of Classification Search
CPC ... H04B 13/005; H04B 5/0031; H04W 76/19; H04W 4/80
See application file for complete search history.

(56) References Cited

U.S. PATENT DOCUMENTS

| | | | |
|---|---|---|---|
| 6,754,472 B1 | 6/2004 | Williams et al. | |
| 7,206,423 B1 * | 4/2007 | Feng | H04B 13/005 381/312 |
| 9,742,471 B1 | 8/2017 | Thoen | |
| 10,292,031 B1 * | 5/2019 | Kerselaers | H04B 5/02 |
| 2014/0269667 A1 * | 9/2014 | Teague | H04W 56/0065 370/350 |
| 2016/0028493 A1 * | 1/2016 | Ohishi | H04B 13/005 455/41.2 |
| 2016/0100239 A1 * | 4/2016 | Shin | H04R 1/1091 381/74 |
| 2017/0366924 A1 * | 12/2017 | Thoen | H04L 1/245 |
| 2018/0115050 A1 | 4/2018 | Yang et al. | |
| 2018/0120930 A1 | 5/2018 | Turner | |

FOREIGN PATENT DOCUMENTS

| | | |
|---|---|---|
| EP | 3116244 A1 | 1/2017 |
| WO | WO-2017035143 A1 | 3/2017 |

OTHER PUBLICATIONS

International Search Report and Written Opinion—PCT/US2020/034676—ISA/EPO—dated Mar. 25, 2021.

* cited by examiner

*Primary Examiner* — Tuan Pham
(74) *Attorney, Agent, or Firm* — Holland & Hart LLP

(57) ABSTRACT

A method for low power communication links between wireless devices is described. The method includes establishing, by a first wireless device, a first magnetic communication link to a source wireless device through a human body. The method also includes establishing, by a second wireless device, a second magnetic communication link to the source wireless device through the human body. The method also includes receiving, by the first wireless device via the first magnetic communication link and the second wireless device via the second magnetic communication link, communications from the source wireless device through the human body.

18 Claims, 5 Drawing Sheets

LOW POWER COMMUNICATION LINKS BETWEEN WIRELESS DEVICES

TECHNICAL FIELD

This disclosure relates generally to communications between wireless devices, and more particularly to low power communication links between wireless devices.

BACKGROUND

Advances in electronic technology have reduced the cost of increasingly complex and useful wireless devices. Cost reduction and consumer demand have proliferated the use of wireless devices to the point that they are relied upon to function in everyday life. As the use of wireless devices has expanded, so has the demand for new and improved features of wireless devices. More specifically, wireless devices that perform new functions, or that perform functions faster, more efficiently or more reliably are often sought after.

To meet consumer demand, wireless devices need to operate very efficiently when it comes to the use of battery power. For example, many wireless devices are becoming increasingly smaller but require much more sustained battery operating times even with smaller battery sizes. The specific wireless communication technology that a wireless device uses to communicate to other wireless devices can have a significant impact on its battery life. For example, magnetic communication is a type of wireless communication technology that can allow wireless devices to operate at lower power levels. In order to increase battery savings on wireless devices, there is a need to provide a way for low power communication links between wireless devices.

SUMMARY

In an aspect of the present disclosure, a method for low power communication links between wireless devices is described. The method includes establishing, by a first wireless device, a first magnetic communication link to a source wireless device through a human body. The method also includes establishing, by a second wireless device, a second magnetic communication link to the source wireless device through the human body. The method also includes receiving, by the first wireless device via the first magnetic communication link and the second wireless device via the second magnetic communication link, communications from the source wireless device through the human body.

The method further includes establishing, by the first wireless device, a third magnetic communication link with the second wireless device through the human body. The first wireless device and the second wireless device can communicate with each other independent of the source wireless device. In one implementation, the first wireless device and the second wireless device can also communicate with each other via a Bluetooth communication link or Bluetooth Low Energy (BLE) communication link.

In another implementation, the first wireless device and second wireless device can independently attempt to reestablish a communication link with the source wireless device if either wireless device loses connection to the source wireless device.

In another implementation, the source wireless device can communicate with the first wireless device independent of the second wireless device. The source wireless device can also communicate with the first wireless device and second wireless device at the same time. The source wireless device can attempt to reestablish a communication link with the first wireless device and second wireless device if either wireless device loses connection to the source wireless device.

The first magnetic communication link, second magnetic communication link, and third magnetic communication link can be a near ultra-low energy field (NULEF) communication link, a near field magnetic induction (NFMI) communication link, or a near field communication (NFC) link. In one implementation, the first wireless device, second wireless device, and third wireless device are in contact with the human body.

In an aspect of the present disclosure, a first wireless device and a second wireless device implementing low power communication links between wireless devices is described. The first wireless device includes a processor and a memory communicatively coupled with the processor and storing computer-readable code that, when executed by the processor, causing the first wireless device to perform the following steps including establishing a first magnetic communication link to a source wireless device through a human body and receiving communications from the source wireless device via the first magnetic communication link through the human body. The second wireless device includes a processor and a memory communicatively coupled with the processor and storing computer-readable code that, when executed by the processor, causing the second wireless device to perform the following steps including establishing a second magnetic communication link to the source wireless device through a human body and receiving communications from the source wireless device via the second magnetic communication link through the human body.

In another aspect of the present disclosure, an apparatus for low power communication links between wireless devices is described. The first wireless device includes means for establishing a first magnetic communication link to a source wireless device through a human body. The second wireless device includes means for establishing a second magnetic communication link to the source wireless device through the human body. The first wireless device and second wireless device includes means for receiving by the first wireless device via the first magnetic communication link and the second wireless device via the second magnetic communication link, communications from the source wireless device through the human body.

In another aspect of the present disclosure, a non-transitory computer-readable medium is described. The non-transitory computer-readable medium includes processor-executable program code configured to cause a processor of a first wireless device and second wireless device for establishing, by the first wireless device, a first magnetic communication link to a source wireless device through a human body, establishing, by the second wireless device, a second magnetic communication link to the source wireless device through the human body, and receiving, by the first wireless device via the first magnetic communication link and the second wireless device via the second magnetic communication link, communications from the source wireless device through the human body.

DETAILED DESCRIPTION

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

The proliferation of wireless devices has accelerated the advancement of short-range wireless communication technologies. The increasing use of smaller wireless devices has also created a need to use short-range wireless communication technologies that allow for lower power communication links in order to provide the most efficient use of battery power. Magnetic communication can provide short-range communications at much lower power than other known short-range communications. For example, near ultra-low energy field (NULEF) communications is a type of magnetic communication technology that can provide for low power communication links between wireless devices.

One way to provide the most efficient low power communication links between wireless devices is through the human body. Many wireless communication technologies such as Bluetooth and Bluetooth Low Energy (BLE) use RF electromagnetic waves which prefer to travel in free space. Magnetic fields have lower loss in the human body than in free space and can use the human body as a wave guide if launched appropriately. This means that magnetic communication links established between wireless devices through the human body can provide the most effective low power links between the wireless devices.

Figure 1:
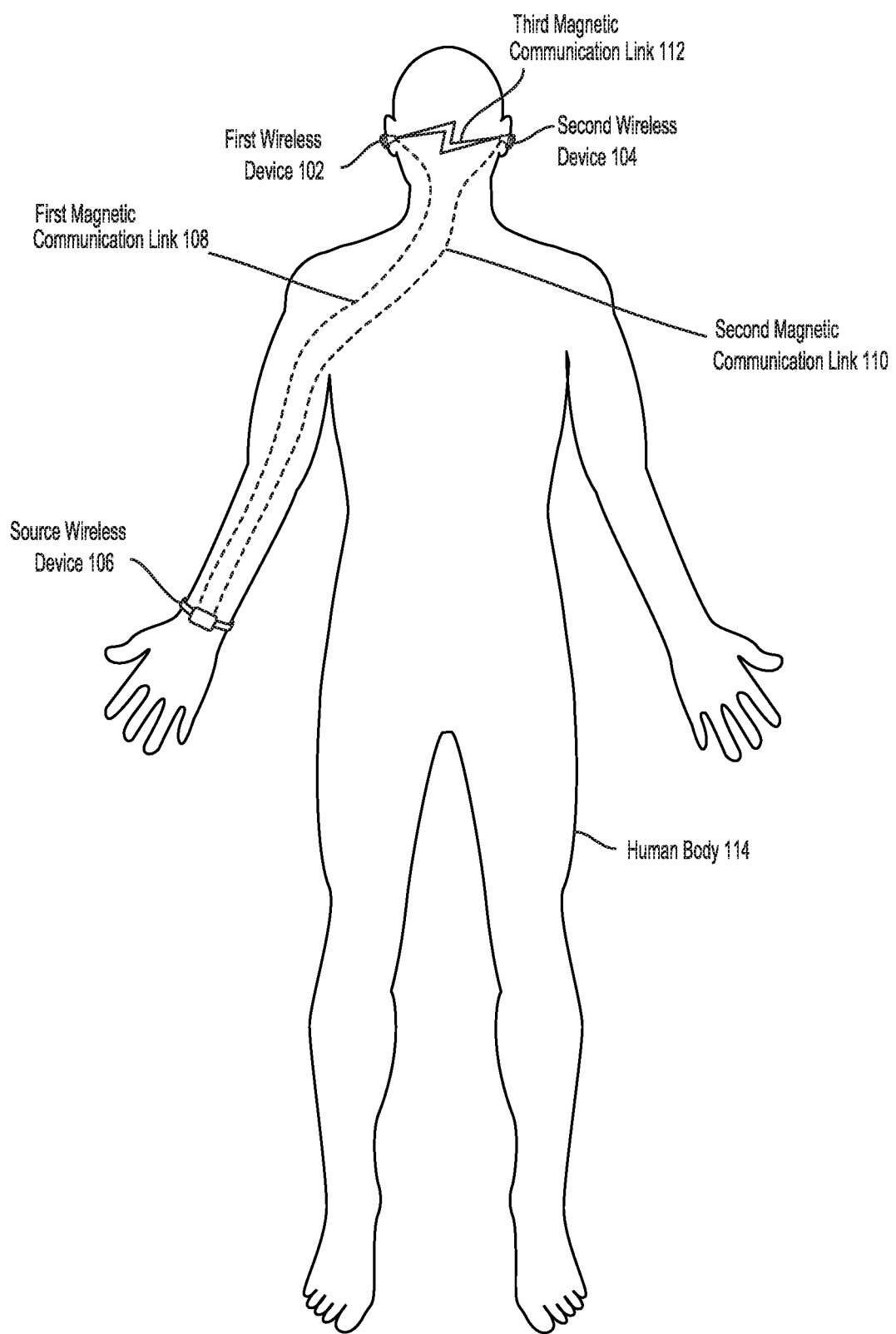
FIG. 1 is a diagram illustrating one configuration of a first wireless device and a second wireless device implementing low power communication links to a source wireless device through a human body.

FIG. 1 is a diagram illustrating one configuration of a first wireless device 102 and a second wireless device 104 implementing low power communication links to a source wireless device 106 through a human body 114.

Some wireless devices may utilize multiple communication technologies. For example, one communication technology may be utilized for mobile wireless system (MWS) (e.g., cellular) communications, while another communication technology may be utilized for wireless connectivity (WCN) communications. MWS may refer to larger wireless networks (e.g., wireless wide area networks (WWANs), cellular phone networks, Long Term Evolution (LTE) networks, Global System for Mobile Communications (GSM) networks, code division multiple access (CDMA) networks, CDMA2000 networks, wideband CDMA (W-CDMA) networks, Universal mobile Telecommunications System (UMTS) networks, Worldwide Interoperability for Microwave Access (WiMAX) networks, etc.). WCN may refer to relatively smaller wireless networks (e.g., wireless local area networks (WLANs), wireless personal area networks (WPANs), IEEE 802.15.4, IEEE 802.11 (Wi-Fi) networks, Bluetooth (BT) networks, Bluetooth SIG specifications and profiles, wireless Universal Serial Bus (USB) networks, etc.), magnetic communications, Near ultra-low energy field (NULEF) communication, NFC (Near-Field Communication), and near field magnetic induction (NFMI).

Communications in a wireless communication system (e.g., a multiple-access system) may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receiver antennas for data transmission. SISO and MISO systems are particular instances of a MIMO system. The MIMO system can provide improved performance (e.g., higher throughput, greater capacity or improved reliability) if the additional functionality created by the multiple transmit and receiver antennas are utilized.

Figure 2:
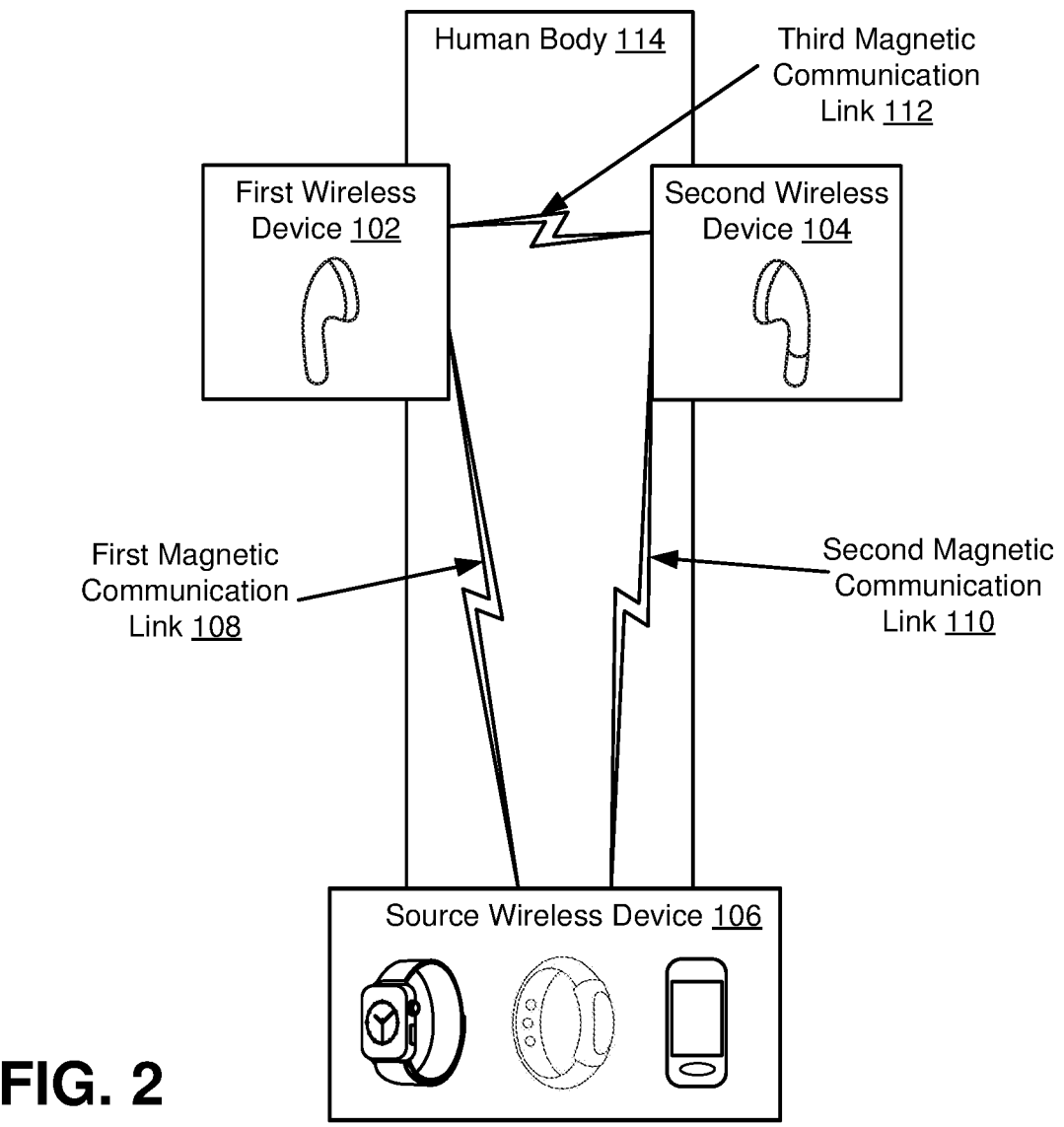
FIG. 2 is a block diagram illustrating examples of a first wireless device and a second wireless device implementing low power communication links to a source wireless device through a human body.

The first wireless device 102, second wireless device 104, and source wireless device 106 may also be separately referred to as a wireless communication device, a mobile device, mobile station, subscriber station, client, client station, user equipment (UE), remote station, access terminal, mobile terminal, terminal, user terminal, subscriber unit, etc. Examples of first wireless device 102, second wireless device 104, and source wireless device 106 include a wireless communication device, mobile station, user equipment (UE), access terminal, laptop computer, desktop computer, e-reader, tablet device, computer, cellular phone, mobile phone, smartphone, wireless headset, server, headphones, headset, earbuds, earphones, hearables, hearing aids, wearable, wearable band, wristband, fitband, smartband, smartwatch, and related devices as shown in FIG. 2.

The first wireless device 102, second wireless device 104, and source wireless device 106 can be wireless devices that are standalone, integrated into another wireless device, and/or are attachable wireless devices that attach to another device to implement the described functionality. The first wireless device 102, second wireless device 104, and source wireless device 106 can be configured to communicate with any of the wireless communication systems discussed above to transmit and receive communications, signals, and/or data packets.

In an implementation, the first wireless device 102, second wireless device 104, and source wireless device 106 may be configured to communicate using magnetic communications such as Near ultra-low energy field (NULEF) communication, NFC (Near-Field Communication), and near field magnetic induction (NFMI). The first wireless device 102, second wireless device 104, and source wireless device 106 configured to communicate using magnetic communications can establish communication links with one or more wireless devices that have magnetic transceivers.

NULEF is similar to NFC, in that communication of data between a NULEF transmitter and a NULEF receiver is achieved by means of magnetic field induction. For example, in some NULEF communication systems the antennas used in the transmitter and receiver are completely symmetrical so the performance of the transceiver is not compromised when switching between transmit and receive modes as would occur with an NFC communication system. In addition, the communication range of an NFC communication system is limited to 100 mm or less; whereas, a NULEF communication system can offer increased communication range up to approximately five (5) meters depending on antenna sizes.

Magnetic communications are achieved via magnetic fields that can effectively penetrate many solid objects including the human body, materials commonly found in the home, and rock where iron, nickel, cobalt, and other ferromagnetic materials are present in relatively low concentrations. Magnetic communications may therefore be possible in various communication situations where substantial levels of attenuation otherwise prevent communication via radio frequency (RF) signals and/or other conventional mechanisms. For example, within buildings, underground, and/or other environments, signal reflection, absorption, and variations in the permittivity of materials in the propagation path can lead to signal attenuation and selective fading that can in turn increase the effective path loss and thereby prevent the possibility of communication. In contrast, for magnetic signals, the most relevant material property is permeability rather than permittivity (i.e., changes in relative permeability values may affect magnetic field levels). As such, magnetic fields have the ability to penetrate various materials that otherwise interfere with RF signals and thereby permit magnetic communication in various scenarios. For example, a NULEF communication system can provide significant low power links between devices when using the human body as a communication medium.

In an implementation using low power communication links, the first wireless device 102 establishes a first near ultra-low energy field (NULEF) communication link 108 to a source wireless device 106 through a human body 114. The second wireless device 104 establishes a second NULEF communication link 110 to the source wireless device 106 through the human body 114. The first wireless device 102 receives communications from the source wireless device 106 via the first NULEF communication link 108 through the human body 114. The second wireless device 104 receives communications from the source wireless device 106 via the second NULEF communication link 110 through the human body 114. The source wireless device 106 can communicate at the same time and/or independently with the first wireless device 102 and second wireless device 104.

Additionally, the first wireless device 102 can establish a third NULEF communication link 112 with the second wireless device 104 through the human body 114. The first wireless device 102 and the second wireless device 104 can communicate with each other independent of the source wireless device 106. The first wireless device 102 and the second wireless device 104 can also communicate with each other via a Bluetooth communication link, Bluetooth Low Energy communication link, magnetic communication link, and related wireless communication types.

Communications can be sent and received by the first wireless device 102, second wireless device 104, and source wireless device 106 with software, hardware, or a combination of both for any type of communications. The software can be standard communications software and/or additional communications software installed on wireless devices to allow for any type of communications. For example, the first wireless device 102, second wireless device 104, and source wireless device 106 can send and receive any type of communications over the first magnetic communication link 108, second magnetic communication link 110, third magnetic communication link 112, and related communication links. The communications can include, but not limited to, audio communications, biometric communications, control communications, configuration communication, data communications, graphical communications, video communications, voice communications, signals, data packets, and related communications.

In one implementation, the first wireless device 102, second wireless device 104, and source wireless device 106 can send and receive encrypted communications to each other and other wireless devices. The first wireless device 102, second wireless device 104, and source wireless device 106 have the necessary hardware and software needed to encrypt and decrypt communications they send to each other and other wireless devices.

Figure 5:
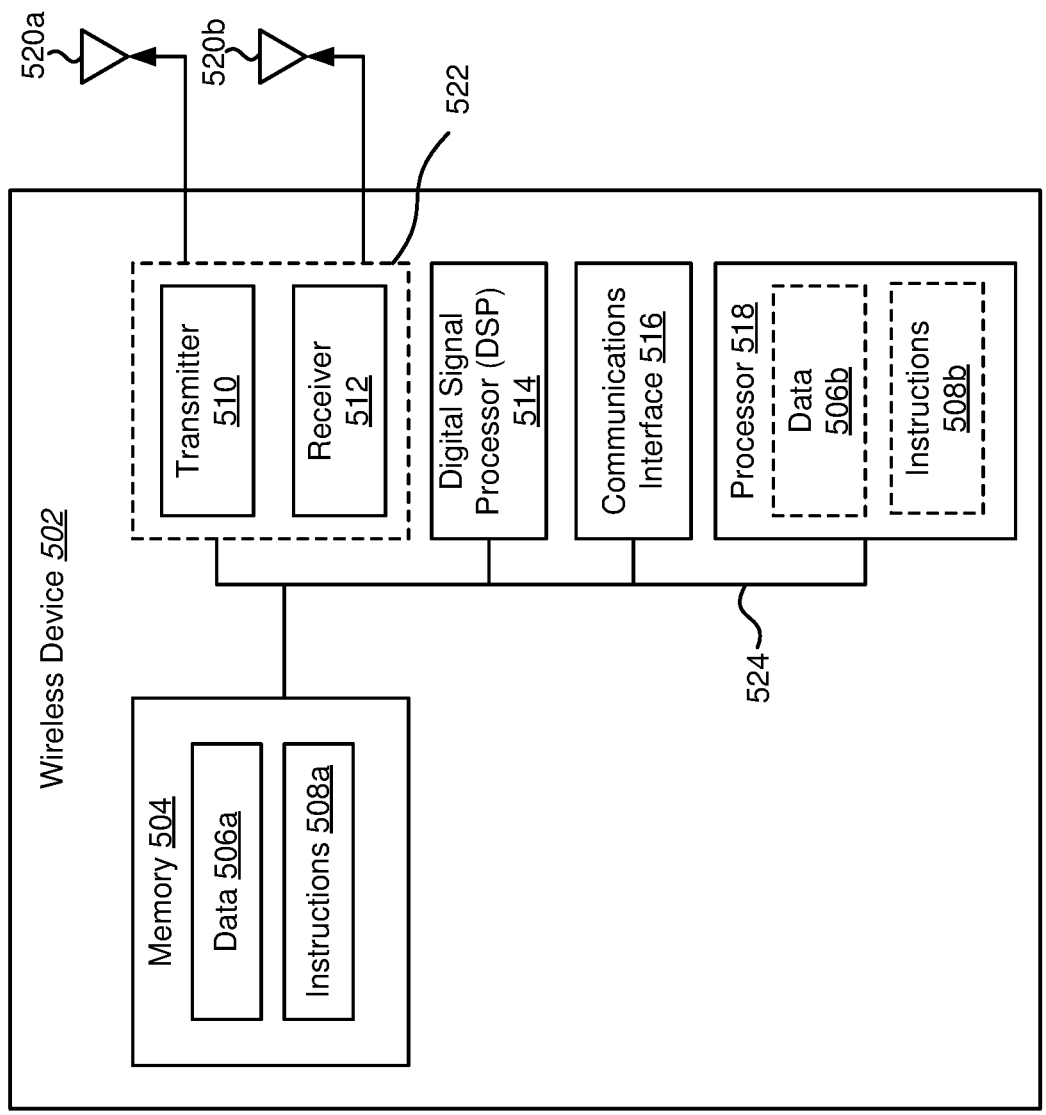
FIG. 5 illustrates certain components that may be included within a wireless device.

The first wireless device 102, second wireless device 104, and source wireless device 106 also include additional software and hardware as further detailed in the wireless device in FIG. 5 which may also include one or more transmitters and receivers, processor(s), memory, antennas, digital signal processor(s), communications interface, user interface, operating systems, transceivers, and related subsystems required to operate and implement the methods described in the first wireless device 102, second wireless device 104, and source wireless device 106.

The description uses terminology associated with NULEF communication systems and more generally to magnetic communications. Nevertheless, the concepts may be applicable to other technologies and standards that involve sending and receiving communications. Accordingly, while some of the description is provided in terms of NULEF configurations, the systems and methods disclosed herein may be implemented more generally in wireless devices that may not conform to NULEF configurations.

Figure 3:
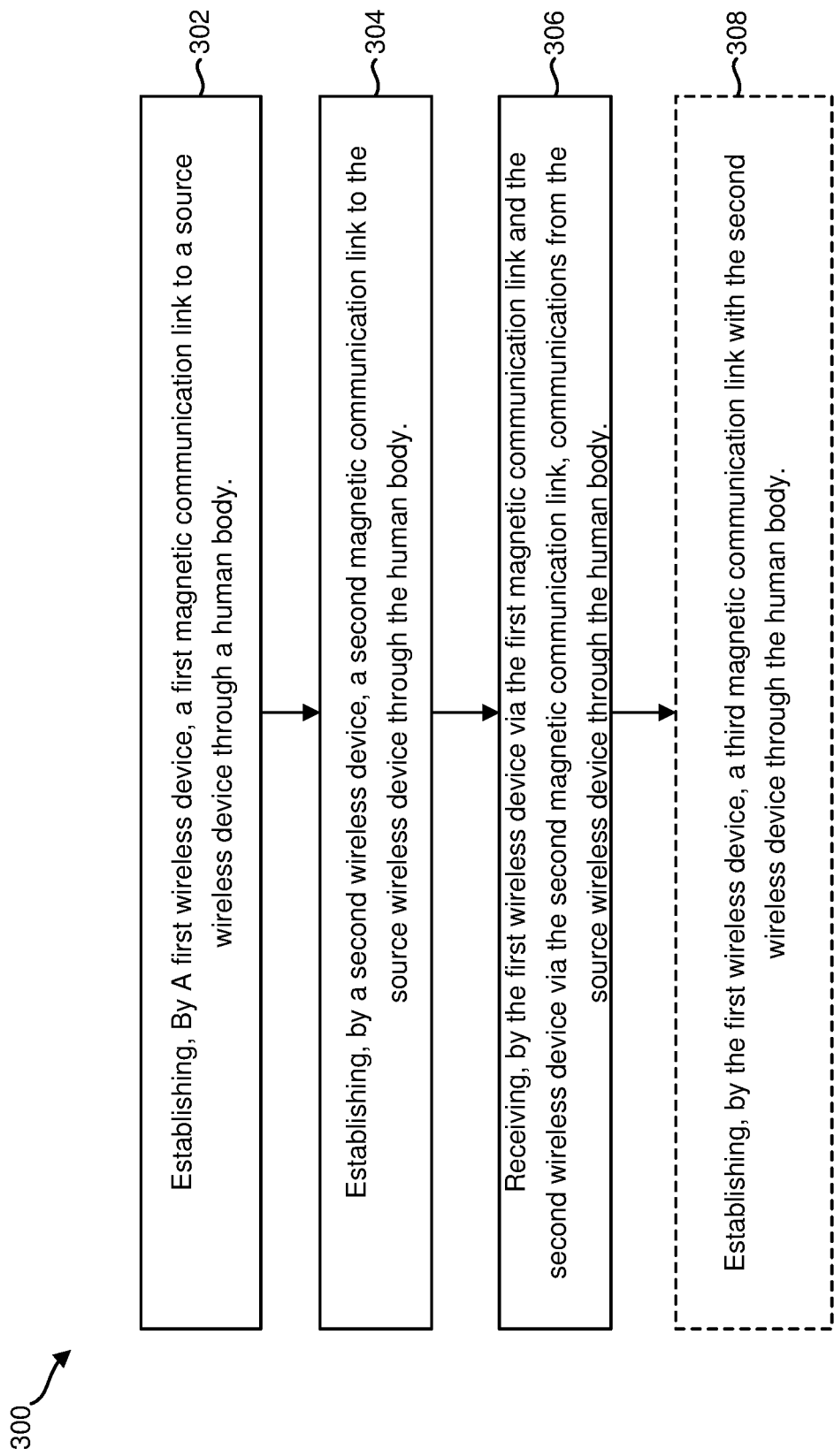
FIG. 3 is a flow diagram illustrating a method for low power communication links between wireless devices.

FIG. 3 is a flow diagram illustrating a method for low power communication links between wireless devices. Referring to FIGS. 1 and 2, this method 300 may be implemented by the first wireless device 102 communicating with the source wireless device 106 over the first magnetic communication link 108 and the second wireless device 104 communicating with the source wireless device 106 over the second magnetic communication link 110 through a human body 114. The human body 114 is used as a conductive medium or communication medium to transmit the communications between the first wireless device 102, second wireless device 104, source wireless device 106, and any other wireless devices.

At step 302, the first wireless device 102 establishes a first magnetic communication link 108 to a source wireless device 106 through a human body 114. Once the first wireless device 102 establishes the first magnetic communication link 108, then the source wireless device 106 can communicate with the first wireless device 102. The first wireless device 102 and source wireless device 106 can communicate directly with each other independent of the second wireless device 104. The source wireless device 106 can also establish a magnetic communication link with the first wireless device 102.

The first magnetic communication link 108 can be an NFC communication link, near field magnetic induction (NFMI) communication link, near ultra-low energy field (NULEF) communication link, and related magnetic communication technology links.

At step 304, the second wireless device 104 establishes a second magnetic communication link 110 to the source wireless device 106 through the human body 114. Once the second wireless device 104 establishes the second magnetic communication link 110, then the source wireless device 106 can communicate with the second wireless device 104. The second wireless device 104 and source wireless device 106 can communicate directly with each other independent of the first wireless device 102. The source wireless device 106 can also establish a magnetic communication link with the second wireless device 104.

The second magnetic communication link 110 can be an NFC communication link, near field magnetic induction (NFMI) communication link, near ultra-low energy field (NULEF) communication link, and related magnetic communication technology links.

At step 306, the first wireless device 102 via the first magnetic communication link 108 and the second wireless device 104 via the second magnetic communication link 110 receive communications from the source wireless device 106 through the human body 114.

The first wireless device 102 and second wireless device 104 can independently communicate with the source wireless device 106. The source wireless device 106 can independently communicate with the first wireless device 102 and second wireless device 104. In one implementation, the first wireless device 102 establishes the first magnetic communication link 108 with the source wireless device 106. The source wireless device 106 can then just send communications to the first wireless device 102. Likewise, the source wireless device 106 can perform the same communication setup with just the second wireless device 104.

The source wireless device 106 can communicate any type of communications to the first wireless device 102 and second wireless device 104. For example, the source wireless device 106 can send control communications to the first wireless device 102 and second wireless device 104 to enable the wireless devices to properly communicate with the source wireless device 106. In another example, the first wireless device 102 and second wireless device 104 can separately send control communications to the source wireless device 106 to enable proper communications setup.

The source wireless device 106 can send communications to the first wireless device 102 and second wireless device 104 based on communication criteria. For example, the communication criteria can include, but not limited to, communication link quality, communication link strength, communication link type, interference statistics, battery power, type of communications, communications size, and related communication criteria separately or in combination. The first wireless device 102, second wireless device 104, and source wireless device 106 can encrypt and decrypt communications that they send to each other.

The first wireless device 102, second wireless device 104, and source wireless device 106 can be in contact with the human body 114. In one implementation, the first wireless device 102 and second wireless device 104 are earbuds in contact with the ears of the human body 114. The source wireless device 106 is a smartwatch that mounts on the wrist of the human body 114. In one example, the smartwatch sends audio communications to the first wireless device 102 and second wireless device 104. The smartwatch can also send control communications (e.g., pause, volume, audio information, and/or audio related controls) to the first wireless device 102 and second wireless device 104 regarding the audio communications.

The source wireless device 106 can attempt to reestablish a communication link with the first wireless device 102 and second wireless device 104 if either wireless device loses connection to the source wireless device 106. The first wireless device 102 and second wireless device 104 can independently attempt to reestablish a communication link with the source wireless device 106 if either wireless device loses connection to the source wireless device 106.

At step 308, optionally the first wireless device 102 establishes a third magnetic communication link 112 with the second wireless device 104 through the human body 114. The first wireless device 102 and the second wireless device 104 can communicate with each other over the third magnetic communication link 112 through the human body 114.

The third magnetic communication link can be an NFC communication link, near field magnetic induction (NFMI) communication link, near ultra-low energy field (NULEF) communication link, and related magnetic communication technology links.

The first wireless device 102, second wireless device 104, and source wireless device 106 can also communicate with each other using other types of wireless communication technologies such as Bluetooth, Bluetooth Low Energy (BLE), Wi-Fi, broadband, and related communication technologies through the human body 114 and/or over the air outside of the human body 114.

The first wireless device 102 and the second wireless device 104 can communicate with each other independent of the source wireless device 106. The first wireless device 102 and the second wireless device 104 can communicate any type of communications with each other. For example, the first wireless device 102 and the second wireless device 104 can communicate control communications to each other. The first wireless device 102 and second wireless device 104 can independently attempt to reestablish a communication link with each other if they lose connection.

Figure 4:
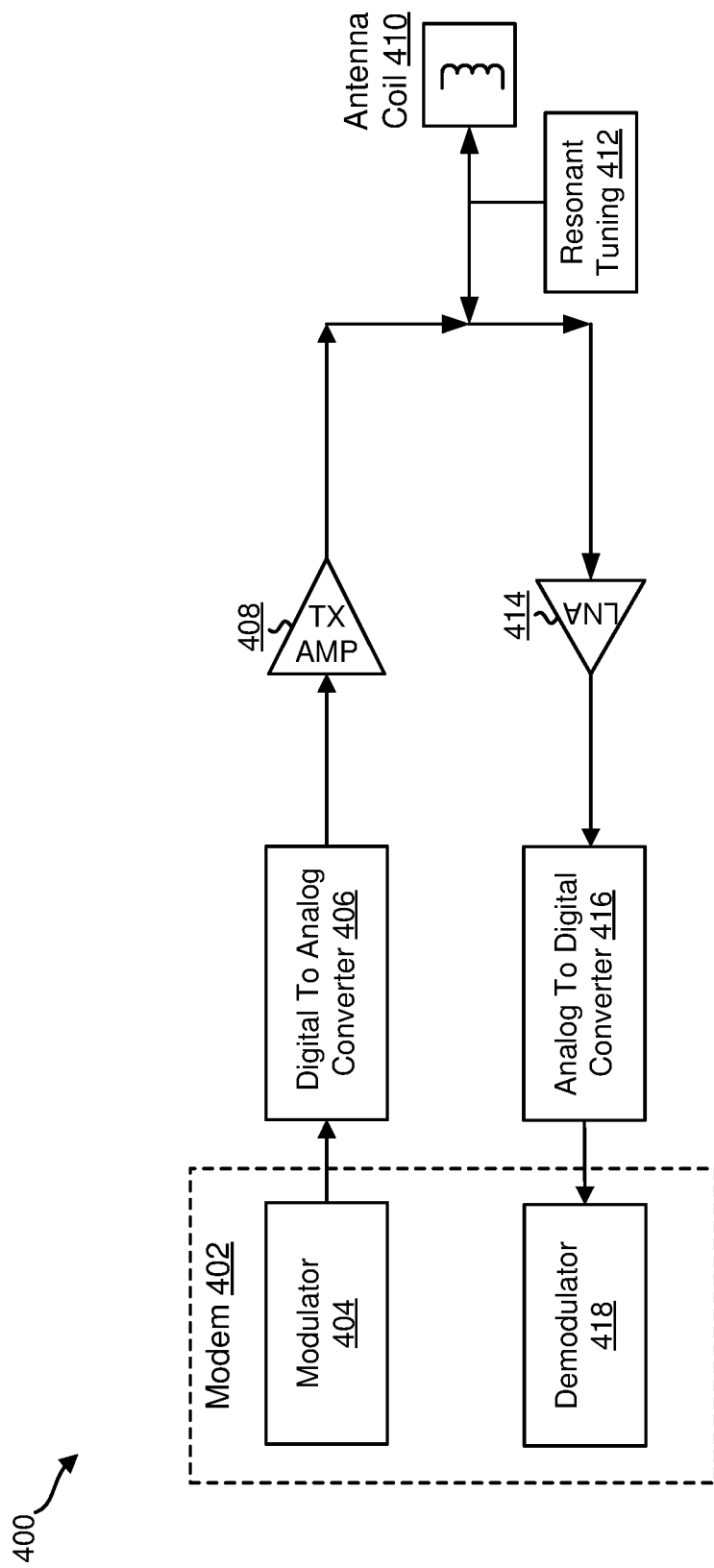
FIG. 4 is a block diagram illustrating one configuration of a Near ultra-low energy field (NULEF) transceiver.

FIG. 4 is a block diagram illustrating one configuration of a Near ultra-low energy field (NULEF) transceiver 400. Since the RF frequencies transmitted by NULEF transceiver 400 are relatively low, between 10 MHz and 20 MHz, up-conversion and down-conversion of the carrier is not necessary making the transceiver a lot simpler than a typical wireless transceiver, not requiring mixers or LO synthesizers.

On the transmit side, the carrier is digitally synthesized at the desired channel frequency and modulated with the data, using the desired modulation scheme, by the modulator 404 in the modem 402. The modulated carrier is then converted to an analog signal by the digital-to-analog-converter (DAC) 406 coupled to the modulator 404. The output of the DAC 406, which could be a current or voltage, is coupled to the TX amplifier 408 which amplifies the signal and delivers it in the form of a current to the antenna coil 410. The signal current passing through the antenna coil produces a magnetic field which is radiated into the medium surrounding the antenna coil 410, with maximum magnetic field strength perpendicular to the coil turns. The resonant tuning circuit 412 coupled to the antenna coil 410 consists of variable capacitors which can be tuned to form a resonant circuit with the antenna coil inductance. Tuning to resonance increases the effective gain of the transceiver, with gain proportional to the quality-factor of the coil and capacitors, allowing the transceiver to operate with very low power consumption in both transmit and receive modes.

On the receive side, the magnetic field of the received communication signal will induce current in the antenna coil 410 which is delivered to the low-noise-amplifier (LNA) 414. The LNA 414 will typically convert this current to a voltage which is amplified and sent to the analog-to-digital converter (ADC) 416 coupled to the LNA 414 output. The ADC 416 digitizes the analog signal and delivers it to the demodulator 418 coupled to the ADC 416 output. The demodulator 418 will detect the channel frequency, extract the data from the digital signal, and deliver it to the wireless device system bus for appropriate distribution.

During transmit mode the LNA 414 input is switched to high-impedance mode so all the current is delivered to the antenna coil 410, and during receive mode the TX amplifier 408 output is programmed to high-impedance so that all the receive current is delivered to the LNA 414. Alternatively, series switches could be used to isolate transmit and receive paths. The NULEF transceiver 400 may include other components in addition to those show in FIG. 4.

FIG. 5 illustrates certain components that may be included within a wireless device 502. Examples of the wireless device 502 may be a wireless communication device, mobile station, user equipment (UE), access terminal, laptop computer, desktop computer, e-reader, tablet device, computer, cellular phone, mobile phone, smartphone, wireless headset, server, headphones, headset, earbuds, earphones, hearables, hearing aids, wearable, wearable band, wristband, fitband, smartband, smartwatch, and related devices. For example, the wireless device 502 may be implemented in accordance with the first wireless device 102, second wireless device 104, and source wireless device 106.

The wireless device 502 includes a processor 518. The processor 518 may be a general purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 518 may be referred to as a central processing unit (CPU). Although just a single processor 518 is shown, a combination of processors (e.g., an ARM and DSP) could be used.

The wireless device 502 also includes memory 504 in electronic communication with the processor (i.e., the processor can read information from and/or write information to the memory). The memory 504 may be any electronic component capable of storing electronic information. The memory 504 may be configured as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 506a and instructions 508a may be stored in the memory 504. The instructions may include one or more programs, routines, sub-routines, functions, procedures, code, etc. The instructions may include a single computer-readable statement or many computer-readable statements. The instructions 508a may be executable by the processor 518 to implement the methods disclosed herein. Executing the instructions 508a may involve the use of the data 506a that is stored in the memory 504. When the processor 518 executes the instructions 508a, various portions of the instructions 508b may be loaded onto the processor 518, and various pieces of data 506b may be loaded onto the processor 518.

The wireless device 502 may also include a transmitter 510 and a receiver 512 to allow for transmission and reception of signals to and from the wireless device 502 via one or more antennas 520a-520b. The transmitter 510 and receiver 512 may be collectively referred to as a transceiver 522. The wireless device 502 may also include (not shown) multiple transmitters, multiple receivers, multiple transceivers, communications controllers, and the like that would further enable the wireless device 502 to transmit and receive wireless communications. For example, the transceiver 522 can be implemented as at least one RF transmitter and receiver and at least one magnetic communication-based transmitter and receiver. The types of wireless communications can include, but are not limited to, Near ultra-low energy field (NULEF) communication, NFC (Near-Field Communication), near field magnetic induction (NFMI), Bluetooth, Bluetooth Low Energy (BLE), Bluetooth BD/EDR (Basic Rate/Enhanced Data Rate), Wi-Fi, LTE, CDMA, ZigBee, broadband, magnetic communications, RF communications, and similar wireless communications.

The antennas 520a-520b may include one or more transmitter antennas and one or more receiver antennas. The particular antenna configurations for the wireless device 502 can be based on the number of transmitters and receivers included in the wireless device 502 along with the particular communication network and other factors. In one implementation, there may be multiple transmitter antennas and multiple receiver antennas on a single wireless device. The antennas can be configured to transmit and receive any type of wireless communications such as RF communications, magnetic communications, and related wireless communications.

Magnetic communication antennas can be integrated into and/or attached to the wireless device 502. In one implementation, the wireless device 502 is a smartwatch or smartband which has an integrated magnetic antenna that wraps around the wristband. In use, the wristband is worn by a human user such that the magnetic field of the magnetic communication link is efficiently launched into the human body through the user's arm.

The wireless device 502 may include a digital signal processor (DSP) 514. The wireless device 502 may also include a communications interface 516. The communications interface 516 may allow a user to interact with the wireless device 502. The wireless device 502 may also include a display, keyboard, touchscreen, mouse, track device, input device, voice interface, microphone, camera, sensors, biometric interface, speaker, and related interface devices.

The various components of the wireless device 502 may be coupled together by one or more buses, which may include a power bus, a control signal bus, a status signal bus, a data bus, etc. For the sake of clarity, the various buses are illustrated in FIG. 5 as a bus system 524.

In the above description, reference numbers have sometimes been used in connection with various terms. Where a term is used in connection with a reference number, this may be meant to refer to a specific element that is shown in one or more of the figures. Where a term is used without a reference number, this may be meant to refer generally to the term without limitation to any particular figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random-access memory (RAM), read-only memory (ROM), non-volatile random access memory (NVRAM), programmable read-only memory (PROM), erasable programmable read-only memory (EPROM), electrically erasable PROM (EE-PROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C.

As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for low power communication links between wireless devices, comprising:
    establishing, by a first wireless device, a first near ultra-low energy field (NULEF) communication link satisfying a threshold distance to a source wireless device through a human body;
    establishing, by a second wireless device, a second NULEF communication link satisfying the threshold distance to the source wireless device through the human body;
    receiving, by the first wireless device via the first NULEF communication link and the second wireless device via the second NULEF communication link, communications from the source wireless device through the human body; and
    wherein the first wireless device and the second wireless device do not retransmit communications between each other.

2. The method of claim 1, wherein the first wireless device and the second wireless device can communicate with each other independent of the source wireless device.

3. The method of claim 2, further comprising:
    establishing, by the first wireless device, a third NULEF communication link with the second wireless device through the human body.

4. The method of claim 2, wherein the first wireless device and the second wireless device can communicate with each other via a Bluetooth communication link or Bluetooth Low Energy (BLE) communication link.

5. The method of claim 1, wherein the source wireless device can communicate with the first wireless device independent of the second wireless device.

6. The method of claim 1, wherein the source wireless device can communicate with the first wireless device and the second wireless device at the same time.

7. The method of claim 1, further comprising:
reestablishing, by the source wireless device, a NULEF communication link with the first wireless device, the second wireless device, or both if the first wireless device, the second wireless device, or both lose connection to the source wireless device.

8. The method of claim 1, further comprising:
reestablishing, by the first wireless device, the second wireless device, or both, a NULEF communication link with the source wireless device if the first wireless device, the second wireless device, or both lose connection to the source wireless device.

9. An apparatus for low power communication links between wireless devices, comprising:
a first wireless device comprising:
a first processor; and
a first memory communicatively coupled with the first processor and storing computer-readable code that, when executed by the first processor, causes the first wireless device to:
establish a first near ultra-low energy field (NULEF) communication link satisfying a threshold distance to a source wireless device through a human body; and
receive communications from the source wireless device via the first NULEF communication link through the human body; and
a second wireless device comprising:
a second processor; and
a second memory communicatively coupled with the second processor and storing computer-readable code that, when executed by the second processor, causes the second wireless device to:
establish a second NULEF communication link satisfying the threshold distance to the source wireless device through a human body;
receive communications from the source wireless device via the second NULEF communication link through the human body; and
wherein the first wireless device and the second wireless device do not retransmit communications between each other.

10. The apparatus of claim 9, wherein the first wireless device and the second wireless device can communicate with each other independent of the source wireless device.

11. The apparatus of claim 10, wherein the first memory stores the computer-readable code that, when executed by the first processor, further causes the first wireless device to:
establish, by the first wireless device, a third NULEF communication link with the second wireless device through the human body.

12. The apparatus of claim 10, wherein the first wireless device and the second wireless device can communicate with each other via a Bluetooth communication link or Bluetooth Low Energy (BLE) communication link.

13. The apparatus of claim 9, wherein the source wireless device can communicate with the first wireless device independent of the second wireless device.

14. The apparatus of claim 9, wherein the source wireless device can communicate with the first wireless device and the second wireless device at the same time.

15. The apparatus of claim 9, wherein the first memory stores the computer-readable code that, when executed by the first processor, further causes the first wireless device to:
reestablish the first NULEF communication link with the source wireless device if the first wireless device loses connection to the source wireless device.

16. The apparatus of claim 9, wherein the second memory stores the computer-readable code that, when executed by the second processor, further causes the second wireless device to:
reestablish the second NULEF communication link with the source wireless device if the second wireless device loses connection to the source wireless device.

17. A non-transitory computer-readable medium comprising processor-executable program code configured to cause a processor of a first wireless device and second wireless device to:
establish, by the first wireless device, a first near ultra-low energy field (NULEF) communication link satisfying a threshold distance to a source wireless device through a human body;
establish, by the second wireless device, a second NULEF communication link satisfying the threshold distance to the source wireless device through the human body;
receive, by the first wireless device via the first NULEF communication link and the second wireless device via the second NULEF communication link, communications from the source wireless device through the human body; and
wherein the first wireless device and the second wireless device do not retransmit communications between each other.

18. An apparatus for low power communication links between wireless devices, comprising:
means for establishing, by a first wireless device, a first near ultra-low energy field (NULEF) communication link satisfying a threshold distance to a source wireless device through a human body;
means for establishing, by a second wireless device, a second NULEF communication link satisfying the threshold distance to the source wireless device through the human body;
means for receiving, by the first wireless device via the first NULEF communication link and the second wireless device via the second NULEF communication link, communications from the source wireless device through the human body; and
wherein the first wireless device and the second wireless device do not retransmit communications between each other.

* * * * *